Figure 2:
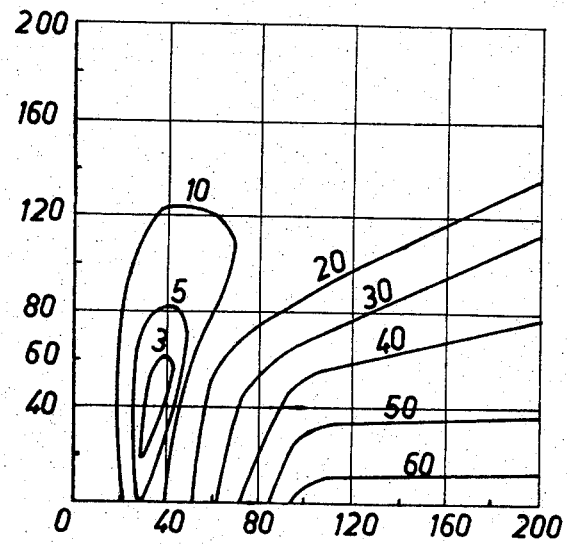

United States Patent

Vergne et al.

[15] 3,676,390
[45] July 11, 1972

[54] COMPOSITIONS OF POLYMERS OF BICYCLA (2.2.1) HEPTENE-2 AND DERIVATIVES

[72] Inventors: Jean Vergne; Leon Solaux; Jean-Claude Robinet; Philippe Lacroix, all of Verneuil-en-Halatte, France

[73] Assignee: Charbonnages De France, Paris, France

[22] Filed: Jan. 20, 1971

[21] Appl. No.: 107,953

Related U.S. Application Data

[63] Continuation-in-part of Ser. No. 739,881, June 25, 1968, abandoned.

[30] Foreign Application Priority Data

June 27, 1967 France.....................................112114
May 16, 1968 France.....................................152120

[52] U.S. Cl..............260/31.8 HR, 260/31.2 R, 260/31.8 R, 260/33.6 UA, 260/33.6 R
[51] Int. Cl........................................C08f 45/40, C08f 45/28
[58] Field of Search........................................260/33.6, 93.1

[56] References Cited

UNITED STATES PATENTS

| | | | |
|---|---|---|---|
| 3,093,621 | 6/1963 | Gladding | 260/80.5 |
| 3,336,275 | 8/1967 | Micheletti | 260/93.1 X |
| 3,367,924 | 2/1968 | Rinehart | 260/93.1 X |
| 3,546,183 | 12/1970 | Vergne et al | 260/93.1 X |

*Primary Examiner*—Lewis T. Jacobs
*Attorney*—Karl W. Flocks

[57] ABSTRACT

The invention relates to a vulcanized elastomer composition consisting essentially of a vulcanized mixture of (1) a macromolecular polymer compound selected from the group consisting of substantially amorphous polymers of bicyclo [2.2.1] heptene-2 and its substituted derivatives (2) at least one compound having a low volatility and a freezing point less than $-30°$ C, this mixture of said polymer and said low volatility compound prior to vulcanization having a glass transition temperature lower than about $-10°$ C, said vulcanized composition having a combination of good mechanical and physical properties.

20 Claims, 4 Drawing Figures

INVENTORS
JEAN VERGNE
LEON SOLAUX
JEAN-CLAUDE ROBINET
PHILIPPE LACROIX

BY KARL W FLOCKS

ATTORNEY

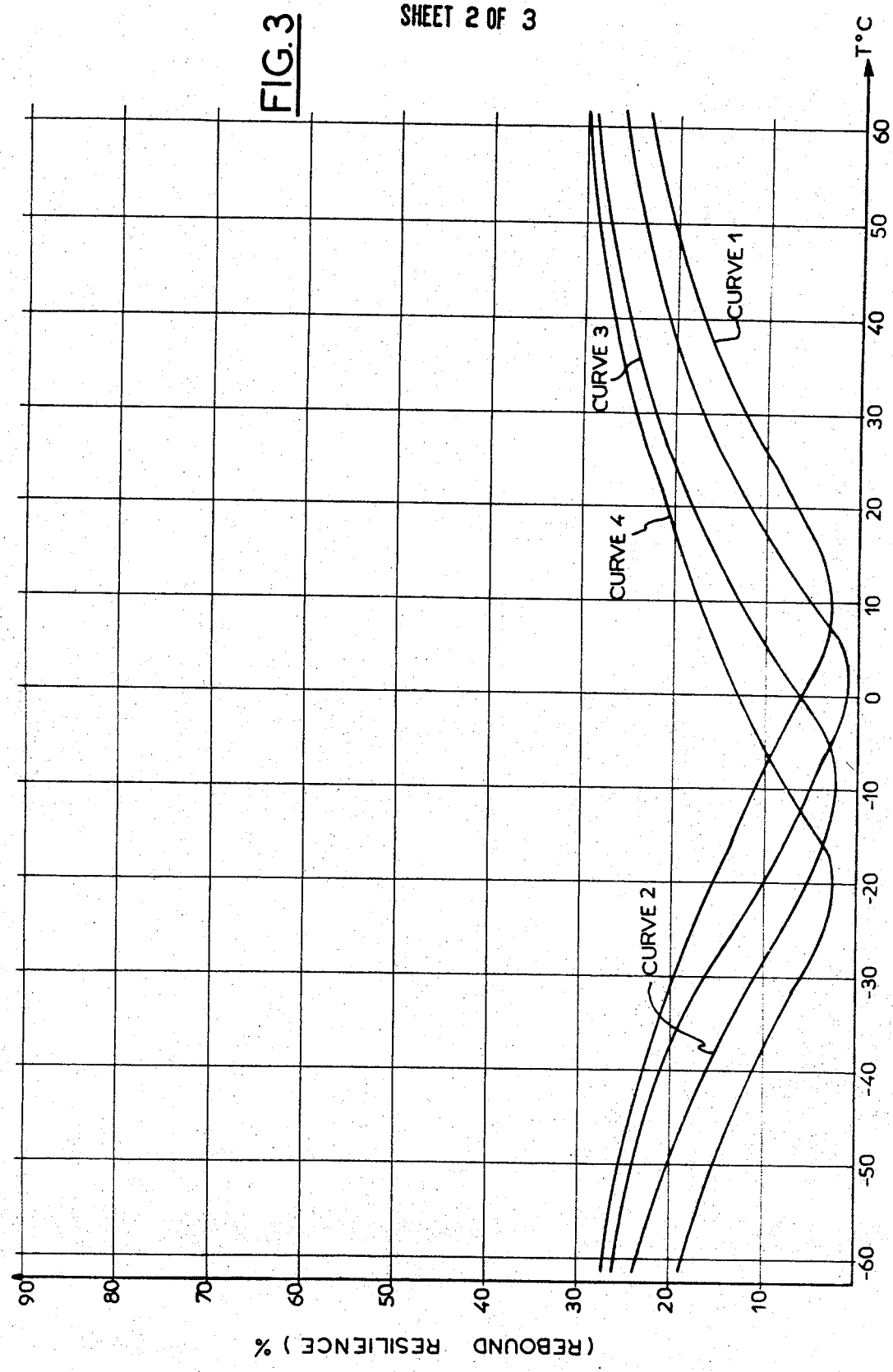

COMPOSITIONS OF POLYMERS OF BICYCLA (2.2.1) HEPTENE-2 AND DERIVATIVES

This application is a continuation-in-part of application Ser. No. 739,881, filed June 25, 1968, and now abandoned.

The present invention relates to new elastomer compositions comprising completely amorphous homopolymers and copolymers with units derived from bicyclo [2.2.1] heptene-2 and its derivatives substituted by substituents with short chains, and to their method of preparation.

Polymers of bicyclo [2.2.1] heptene-2, known as BCH and methyl-5 bicyclo [2.2.1] heptene-2, known as MBCH, prepared for example in the presence of a catalyst constituted by a mixture composed of titanium with a compound containing at least one metal-hydrocarbon bond, or in the presence of palladium compounds, are already known (see U.S. Pat. No. 2,932,630 to Robinson et al. on Apr. 12, 1960; Takata et al. "Polymerizations of 5-methyl bicyclo [2.2.2] octene, 5-methyl bicyclo [2.2.1] heptene and camphene," Kogyo Kaguky Zasshi, 69 (1966), No. 4, pages 593 and 782 and U.S. Pat. No. 3,330,815 to McKeon et al. on July 11, 1967).

These are polymers with a relatively high melting point, obtained either by polymerization on the double bond or by opening the cycle containing the double bond, and applicable in the field of plastomers. It has also been shown (Michelotti et al., "Co-ordinate polymerization of the bicyclo [2.2.1] heptene-2 Ring System (Norbornene) in Polar Media," Journal of Polymer Science, Part A, 3 (1965), pages 895–905; and Rinehart et al., "The emulsion polymerization of the Norbonene Ring System catalyzed by noble metal compounds," Polymer Letters 3 (1965), pages 1,049–1,052) that it was possible to obtain a completely amorphous polymer of bicyclo [2.2.1] heptene-2 and its substitution derivatives, the substituents of which have short chains, by opening the cycle containing the double bond, such polymers containing simultaneously double bonds in the cis-position and double bonds in the trans-position. These polymers were obtained by initiating with the aid of salts of noble metals, in particular by means of halides and more particularly by means of hydrated ruthenium chloride in the presence of a reducing agent such as an alcohol. Such polymers do not have any melting point.

Now, the Applicants have discovered that these polymers have glass transition temperatures substantially equal to or higher than 25° C., that is to say they are in the rubbery form above this temperature and have the form of a stiff plastic material below this temperature. A glass transition temperature close to the ambient temperature obviously constitutes a major disadvantage for the use of these polymers, which for this reason have not been able to have any definite application.

The present invention provides useful elastomer compositions comprising such polymers having a glass transition temperature less than about −10° C., and having after vulcanization a unique combinaison of valuable mechanical properties such as a high Young's modulus, a high breaking strength, a high reversible elongation, together with a very low rebound resilience associated with good compression remanence characteristics, good resistance to oils, good resistance to ageing and good tensile strength properties.

The object of the present invention is achieved by combining, 100 parts by weight of a macro-molecular compound selected from the group of the substantially amorphous polymers of bicyclo [2.2.1] heptene-2 and its substituted derivatives of the formula:

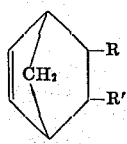

wherein R is H, $CH_3$, $CO_2CH_3$ or $OCOCH_3$, and R' is H, $CO_2CH_3$ with the condition that when R' is $CO_2CH_3$ then R is also $CO_2CH_3$, and their substantially amorphous co-polymers said polymer compound having an initial glass transition temperature of about 25°–65°C and resulting from the opening of the cycle containing the double bond, said polymer compound containing simultaneously double bonds in the cis-position and double bonds in the trans-position, obtained by polymerization in the presence as initiator of a salt of a noble metal of the platinum group and an alcohol reducing agent, with about 30 to about 400 parts by weight of at least one compound having a low volatility and a freezing point less than −30° C and containing substantially no ethylene unsaturation and selected from the group consisting of the organic esters derived from aliphatic and cyclanic alcohols, the aliphatic, aromatic and naphthenic hydrocarbons and their mixtures, and more preferably those, amongst these substances and their mixtures, which are compatible in practically all proportions with the polymers or co-polymers.

As macro-molecular basic compounds appropriate to the invention, there can be cited the homo-polymers of bicyclo [2.2.1] heptene-2, methyl-5 bicyclo [2.2.1] heptene-2, the methyl esters of bicyclo [2.2.1] heptene-2 oic-2 or dioic-5, 6 having the following formulas:

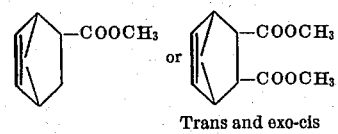

Trans and exo-cis the homo-polymers of the acetate of bicyclo [2.2.1] heptene-2 ol-5 having the formula:

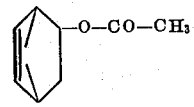

and the co-polymers of two of its derivatives between each others.

The compositions according to the invention can be vulcanized by the usual methods employed in the rubber field, in the presence of vulcanizing agents (such as sulphur and dithiocarbamates), vulcanization accelerators and, when so required, fillers which are generally employed in the rubber industry, such as carbon black, silica, kaolin, calcium carbonate and the like, carbon blacks of SAF or ISAF type being most preferred.

Among the substances having a freezing point below −30° C applicable to the invention, there may be cited the esters such as di-octyl phthalate, i.e., [di(ethylhexyl)] phthalate, di-octyl sebacate, butyl oleate, etc. and hydrocarbons or mixtures of relatively heavy hydrocarbons of paraffinic type such as "SUNPAR 115" oil from Sun Oil Company, etc., especially the mixtures of essentially aromatic and/or naphthenic hydrocarbons derived from petroleum or coaltar such as aromatic type "DUTREX" oils and preferably "DUTREX $V_2$, $V_4$ or $V_{10}$" from Shell Company, aromatic type "EXAROL 10 and 20"" oil from Compagnie Francaise Du Raffinage and "SUNDEX 790, 8125, 8180 or 890" oils from Sun Oil Company, etc., anthracenic oils, chrysene oil, naphthenic type oils such as "CIRCOLIGHT PROCESS OIL," "CIRCOSOL 380" oil from Sun Oil Company and hydrogenates of coaltar fractions of boiling points between 190° C and 500° C, etc.

The proportion of the substances with low freezing points with respect to the polymer or co-polymer may vary from 30 to 400 parts by weight for 100 parts of polymer or copolymer.

The present invention also relates to a method of preparation of these elastomer compositions. The description which follows also refers to polymers and co-polymers utilized in their preparation, some of these polymers or co-polymers being new, and the method of preparation of some of these latter. For the preparation of the polymers and co-polymers according to the invention there is added to the monomer (s), dissolved as may be required in a suitable solvent, a solution of an initiator agent belonging to the family of the salts of noble metals, such as hydrated ruthenium chloride, in the presence of a reducing agent selected from the group of the alcohols; the solution thus obtained is de-gasified and heated between 30° C. and 120° C for about 6 hours.

For the manufacture of the compositions of the invention, there is incorporated in the basic polymer or co-polymer, by mixing in an internal mixer or in a roller mixer, the substance with the freezing point lower than −30° C together with the appropriate fillers, when so required.

The incorporation is advantageously effected at a temperature of the order of 80° C in order to reduce the viscosity of the polymer or co-polymer.

According to an embodiment of the invention the polymerization of the monomers is carried out in the presence of the substance with a low freezing point in order to obtain directly an elastomer composition. In this case, the substance with a low freezing point should contain substantially no olefinic unsaturation.

The elastomer compositions thus obtained may be treated under the usual conditions of the rubber industry, for example by vulcanization.

The following examples, given by way of illustration but not in any limitative sense, will enable the scope and the advantage of the invention to be more clearly understood.

In all these examples:

The glass transition temperatures are measured by means of a differential thermal analysis apparatus du Pont 900. The rate of heating is 50° C/min;

The mechanical properties under tension, such as the breaking force, the modulus at 100 percent elongation, the modulus at 200 percent elongation, the elongation to breaking, are measured in accordance with the standard ASTM D 412;

The Shore A hardness is measured in accordance with the standard ASTM D 676;

The resilience of rebounding is measured according to the standard DIN 53-512;

The compression remanence is measured in accordance with the standard ASTM D 395, method B;

The swelling in oils is measured at 23° C in accordance with the standard ASTM D 471, with the oils ASTM Nos 1,2,3, the results being given in percent by volume;

The other percentages are given by weight.

EXAMPLE 1
Synthesis of Poly-Bicyclo [2.2.1] Heptene-2 (Amorphous) Poly-BCH

To a solution of 200 grams of BCH in 200 cm$^3$ of n-butanol there is added 0.130 gram of hydrated ruthenium chloride in 50 cm$^3$ of n-butanol. The de-gasified solution is heated under nitrogen to 90° C for 6 hours. The polymer obtained in the form of a greenish-white mass is ground, washed with methanol, impregnated with a methanol solution with 0.5 percent of anti-oxidizing agent [bis (2 hydroxy-3 tert butyl 5-methyl-phenyl) methane] known as anti-oxidizing agent 2246, and then dried until its weight is constant. The yield is practically quantitative. The polymer has the following properties:

Glass transition temperature 35° C: modulus at the origin 160 kg/sq.mm; reversible elongation 5 percent; elongation to breaking 100 percent; breaking force 2.5 kg/sq.mm; these latter characteristics being determined at 20° C.

EXAMPLE 2
To a solution of 200 grams of BCH in 200 cm$^3$ of xylene, there is added 0.130 gram of hydrated ruthenium chloride dissolved in 50 cm$^3$ of butanol. The de-gasified solution is heated under nitrogen to 90° C for 6 hours. The gelatinous mass of polymer is ground and the polymer is precipitated by methanol, washed and then impregnated with a methanol solution with 0.5 percent of anti-oxidizing agent (2246), and then dried until its weight is constant. The yield is practically quantitative. The polymer obtained has characteristics which are practically identical with those of the polymer of Example 1.

EXAMPLE 3
20 grams of BCH are dissolved in 10 grams of a perhydrogenate of chrysene oil containing 0.100 gram of 2246 anti-oxidizing agent. This perhydrogenate was obtained by heating chrysene oil over a catalyst with a base of tungsten sulphide and nickel sulphide on alumina, following the technique described in French Patent No. 1.359.910 and then freed from its light constituents by distillation at 50 mm. Hg up to 200° C. It contained 87.8 percent of completely saturated hydrocarbons, almost exclusively naphthenic, 12.2 percent of hydro-aromatic hydrocarbons, and was completely free of ethylene hydrocarbons. There is added 1 cm$^3$ of a butanol solution containing 0.5 mg. of hydrated ruthenium chloride. The de-gasified solution is heated under nitrogen to 90° C for 6 hours. The polymer is dried until its weight is constant. It is in the form of rubbery mass having a glass transition temperature of −40° C.

EXAMPLE 4
Synthesis of Polymethyl-5 Bicyclo [2.2.1] Heptene-2 (Poly-MBCH)

The operation is effected as in Example 1, the BCH being replaced by an identical quantity of MBCH. There is obtained, with a practically quantitative yield, a polymer having a glass transition temperature of 35° C. The infra-red spectrum of this polymer has a band attributable to the methyl group; for the remainder, it is identical with the infra-red spectrum of the poly-BCH obtained in the presence of ruthenium chloride. The polymerization is thus effected by opening the cycle. The mechanical properties in tension of the polymer at 20° C are as follows: modulus 110 kg/sq.mm.; reversible elongation 4 percent; breaking elongation 200 percent; breaking force 3.4 kg:sq.mm.

EXAMPLE 5
Synthesis of the Co-Polymer of Bicyclo [2.2.1.] Heptene-2 and Methyl-5 Bicyclo [2.2.1] Heptene-2

The operation is carried out as in Example 1, but by using a mixture of equal parts of BCH and MBCH. There is obtained, with a practically quantitative yield, a copolymer having a glass transition temperature of 35° C. and characteristics very close to those of each of the two homo-polymers; modulus at the origin 130 kg/sq.mm.; reversible elongation 4.7 percent; breaking elongation 200 percent; breaking force 3.1 kg/sq.mm.

Starting from mixtures having different proportions of BCH and MBCH, there are always obtained co-polymers having glass-transition temperatures at about 35° C. Examples of preparation of elastomer compositions are given below.

EXAMPLE 6
100 parts of the polymer of Example 1, obtained in granular form, are first of all incorporated with 70 parts of a preponderantly naphthenic oil, the "Circo light rubber process oil" of the Sun Oil Company.

This oil has the following characteristics: aniline point 69; hydrocarbon composition: C in aromatic cycles, 20 percent; C in naphthenic cycles, 39 percent; C in paraffin chains 41 percent. The incorporation is effected in an internal mixer at a temperature of 80° C. The polymer and the oil are preferably brought together in the cold state a few hours before passing into the internal mixer; this considerably facilitates the mixing. After mixing for 10 minutes, the elastic product obtained is mixed with the remainder of the ingredients on the roller mixer. There are incorporated 34 parts of Vulcan 3 black (H.A.F. black), 5 parts of zinc oxide, 2.5 parts of sulphur and 1 part of the accelerator Rodifax 16 (N-cyclohexyl-benzothiazyl sulphenamide). The mixing time is 15 minutes. The mixture is allowed to rest for 24 hours. It is then vulcanized at 155° C for 30 minutes in the form of plates from which will be cut out the test-samples which will permit the tensile test to be carried out following the standard ASTM No D.638.

The glass-transition temperature of the vulcanized mixture described above is −47° C, measured by means of a du Pont 900 differential thermal analysis apparatus. The modulus at 100 percent elongation is measured as 0.37 kg/sq.mm; the modulus at 200 percent is 0.43 kg/sq.mm; the elongation to breaking is 300 percent and the breaking load is 1.43 kg/sq.mm.

EXAMPLE 7

100 parts of the polymer of Example 1 are mixed following the method described in the previous example with 70 parts of Circo light oil and are then incorporated with 50 of precipitated silica type SPS Hoesch KS on a roller mixer. The reticulation agents : 4 parts of zinc oxide, 2 parts of sulphur, 1 part of Rodifax 16 are added and the mixture is vulcanized at 155° C for 30 minutes. The properties of the vulcanized polymer are as follows: glass-transition temperature : −47° C; modulus at 100 percent elongation : 0.35 kg/sq.mm. ; elongation to breaking 340 percent; breaking load : 2.28 kg/sq.mm.

EXAMPLE 8

100 parts of the polymer prepared as in Example 2 are incorporated with 30 parts of octyl phthalate, 20 parts of precipitated silica type SPS, 4 parts of zinc oxide, 2 parts of sulphur and 1 part of Rodifax 16. The mixture is carried out on an internal mixer at 80° C and it is then vulcanized at 155° C for 35 minutes. The properties of the vulcanized product obtained are as follows : glass-transition temperature : −23° C. modulus at 100 percent elongation : 0.6 kg/sq.mm ; elongation to breaking 330 percent ; breaking load 2.77 kg/sq.mm.

EXAMPLE 9

A mixture in which the precipitated silica KS 300 is replaced by 20 parts of Vulcan 3 black (H.A.F. black) is prepared and vulcanized under the same conditions as in the previous example. The properties of the vulcanized product obtained are as follows : glass-transition temperature : −23° C.,; modulus at 100 percent elongation : 0.87 kg/sg.mm.; elongation to breaking : 260 percent; breaking load 2.86 kg/sq.mm.

EXAMPLE 10

A mixture containing 100 parts of poly-BCH, 50 parts of Dutrex V2 oil (predominantly aromatic Shell oil), 30 parts of Vulcan 3 black, 2 parts of stearic acid, 5 parts of zinc oxide, 2 parts of sulphur, 1 part of Rodifax 16 and 1 part of zinc mercapto-benzimidazole (Z 21) is prepared following the technique of the previous Examples and vulcanized at 155° C. for 30 minutes. The properties of the vulcanized product obtained are as follows : glass-transition temperature −30° C. ; modulus at 100 percent elongation: 0.18 kg/sq.mm. ; elongation to breaking : 700 percent ; breaking force : 4.25 kg/sq.mm. ; Shore A hardness: 63; resilience 10 percent; remanence of compression : 15 percent.

EXAMPLE 11

A mixture containing 100 parts of poly-BCH, 120 parts of Dutrex V2 oil, 30 parts of Vulcan 3 black, 2 parts of stearic acid, 5 parts of zinc oxide, 2 parts of sulphur, 1 part of Rodifax 16, 1 part of Z 21, is prepared following the method of the previous examples and vulcanized at 155° C. for 30 minutes. The properties of the vulcanized product obtained are as follows : glass-transition temperature : −50° C.; modulus at 100 percent elongation : 0.09 kg/sq.mm. ; elongation to breaking: 900 percent ; breaking force : 2.1 kg/sq.mm. Shore A hardness : 63; resilience: 27 percent; compression remanence 16 percent; swelling in oil ASTM No. 1: 2.5 percent; in ASTM No.2: 3.4 percent; in ASTM No.3: 5.0 percent.

EXAMPLE 12

The rubbery mixture of Example 3 is put directly into a roller mixer at the ambient temperature. There is incorporated with it 50 parts of Vulcan 3 black, 5 parts of zinc oxide, 2 parts of stearic acid, 1 part of sulphur, 0.5 part of Rodifax 16 and 0.5 part of Z 21. This mixture is vulcanized at 155° C. for 30 minutes. The properties of the vulcanized product obtained are as follows : glass-transition temperature : −37° C.; modulus at 100 percent elongation : 0.12 kg/sq.mm.; elongation to breaking; 700 percent; breaking force: 1.85 kg/sq.mm.

EXAMPLE 13

Figure 1:
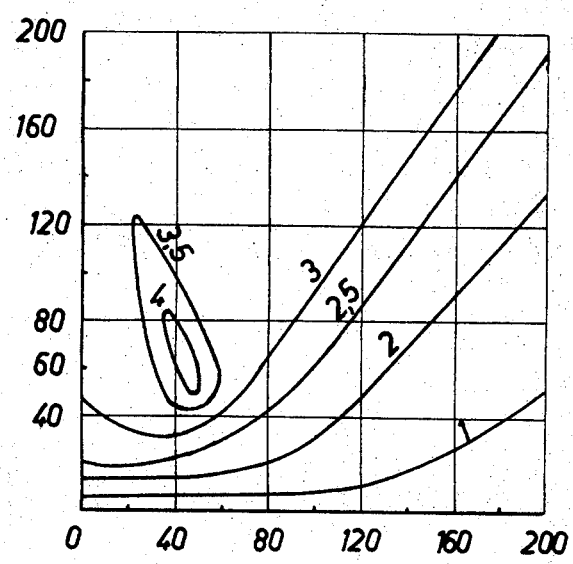

Mixtures containing 100 parts of bicyclo [2.2.1] heptene-2, quantities varying from 30 to 200 parts of Dutrex V2 oil, quantities varying from 5 to 200 parts of Vulcan 9 black S.A.F, 2 parts of stearic acid, 5 parts of zinc oxide, 2 parts of sulphur, 1 part of Rodifax 16, 1 part of Z 21, are prepared in accordance with the technique of the preceding examples and vulcanized at 155° C. for 30 minutes. The properties of the vulcanized products obtained are as follows : modulus at 100% elongation : from 0.05 to 2.0 kg/sq.mm; elongation to breaking from 200 to 800 percent; Shore A hardness from 20 to 90. With regard to the variations of the breaking force and the rebound resilience as a function of the quantity of oil and of black, these are respectively shown in the curves of the accompanying FIGS. 1 and 2, on which are plotted in abscissas the quantities of oil (in parts by weight) and in ordinates the quantities of black (in parts by weight).

It is clear from these figures that the optimal properties, that is to say 4 kg. per sq.mm. for the breaking force ( FIG. 1 ) and 3 percent for the resilience (FIG. 2) correspond to a quantity of oil of 40 parts and to a quantity of black of 60 parts per 100 parts of polymer.

EXAMPLE 13a

Four mixtures each containing 100 parts of poly-BCH, 200 parts of Vulcan 9 black (S.A.F.), 5 parts of zinc oxide, 2 parts of stearic acid, 2 parts of sulphur, 2 parts of Rodifax 16 and 200 parts of a different oil (aromatic oil Dutrex $V_{10}$ for the first mixture, aromatic oil Dutrex $V_4$ for the second mixture, aromatic oil Dutrex $V_2$ for the third mixture and naphthenic oil Circo light rubber process aid oil for the fourth mixture) were prepared and vulcanized as in the preceding examples. On examining FIG. 3 it can be seen from each curve (1–4) corresponding to each mixture (1–4) that the rebound resilience is below 30 percent for any temperature comprised between −50° and +60° C.

EXAMPLE 13b

Figure 4:
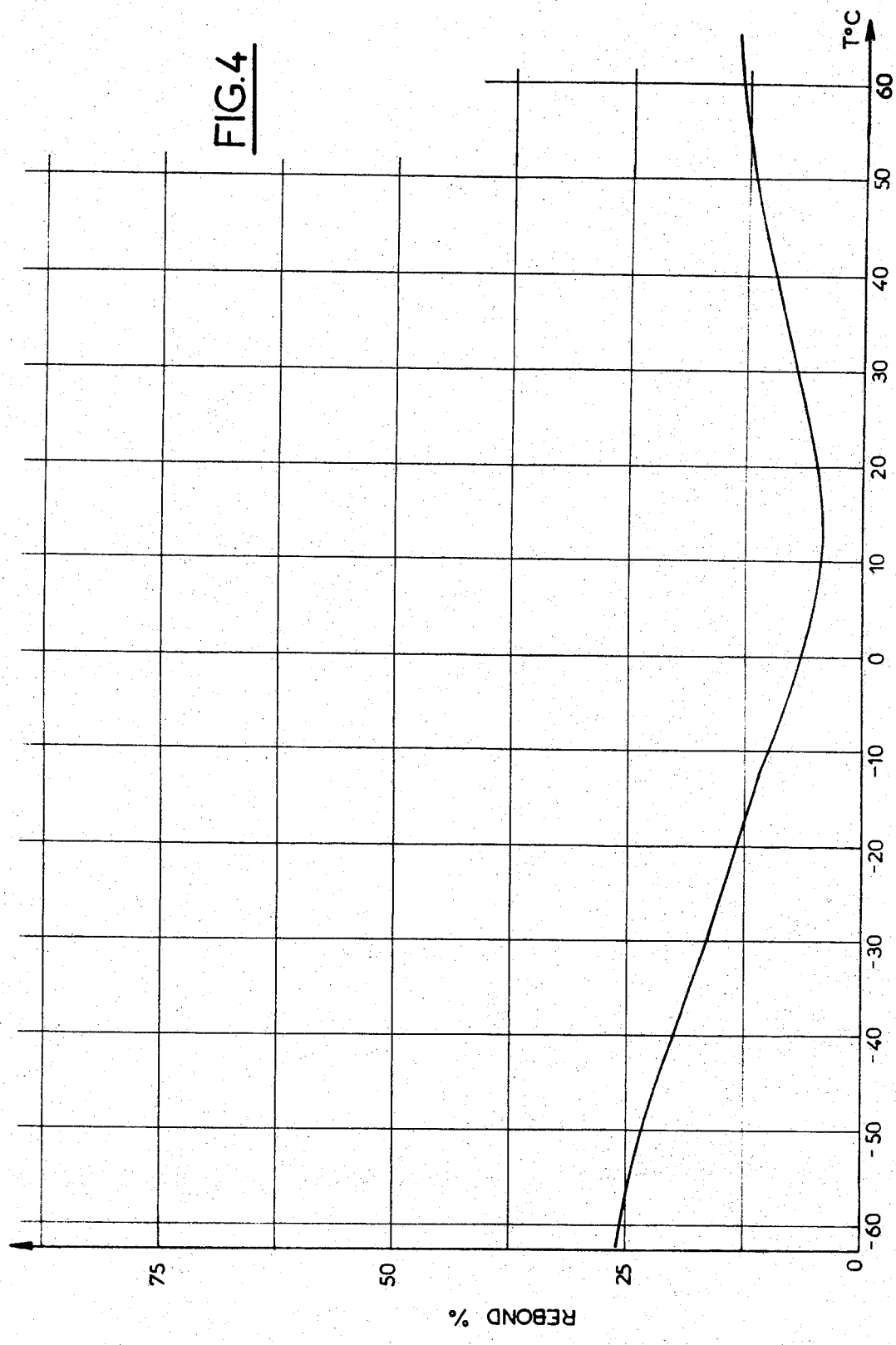

With a mixture prepared and vulcanized as above but containing for 100 parts of poly-BCH, 400 parts of Dutrex $V_4$, 400 parts of Vulcan 9 black (S.A.F.), 5 parts of zinc oxide, 2 parts of stearic acid, 3 parts of an antioxidizing agent (Permanax 45), 4 parts of sulphur and 4 parts of Rodifax 16, the curve of FIG. 4 shows a low rebound resilience below 25 percent for any temperature comprised between −50° C and +60° C. Among the other valuable properties of such a vulcanized mixture one can mention: a glass transition temperature of −44° C; a breaking load of 0.75 kg/mm$^2$; an elongation to breaking of 175 percent; a Shore A hardness of 74; a compression remanence of 32 percent; and a swelling in oil ASTM No. 1 of −2 percent; in oil ASTM No. 2 of 0 percent and in oil ASTM No. 3 of +2.8 percent. As comparison the swelling in oil ASTM Nos. 1,2 and 3 at 70° C are respectively −12 percent, −4.7 percent and +17.1 percent.

EXAMPLE 14

100 parts of polymethyl-5 bicyclo [2.2.1] heptene-2 obtained as described in Example 4, are incorporated in the form of granules in 50 parts of Dutrex V2 oil in an internal mixer at a temperature of 80°C. Into the rubbery compound obtained there are then incorporated in a roller mixer at a temperature of 50°C the following compounds: Vulcan 3 black: 30 parts; Z 21; 1 part; zinc oxide: 5 parts; sulphur: 1 part; Rodifax 16: 1 part. The mixture obtained is vulcanized at 155°C for 30 minutes. The glass-transition temperature is −34°C. The mechanical properties are as follows: modulus at 100 percent elongation: 0.12 kg/sq.mm; elongation to breaking : 700 percent; breaking load : 2.15 kg/sq.mm.; Shore A hardness: 74; resilience 11 percent; compression remanence: 40 percent.

EXAMPLE 15

A mixture is prepared under the same conditions as in the previous Example, but the Vulcan 3 black is replaced by 30 parts of precipitated silica. The properties of this mixture are practically identical with those of the vulcanized product of the previous Example.

EXAMPLE 16

100 parts of the co-polymer described in Example 5 are incorporated in the internal mixer with 50 parts of Dutrex V2 oil. With the rubbery product obtained there are incorporated in the roller mixer, 30 parts of Vulcan 3 black; 1 part of Z 21; 2 parts of sulphur and 1 part of Rodifax 16. Vulcanization is carried out at 155° C. for 30 minutes. The properties of the vulcanized product obtained are as follows: modulus at 100 percent elongation : 0.25 kg/sq.mm.; elongation to breaking: 500 percent; breaking load: 3 kg/sq.mm.

EXAMPLE 17

Polymer of the :

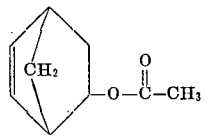

Into a flask there are introduced 51 grams of acetate of bicyclo [2.2.1] heptene-2 ol-5, 20 mg. of $RuCl_3$, $3H_2O$ dissolved in 7 ml of butyl alcohol, and 0.2 gram of 2246 anti-oxidizing agent (di [hydroxy-2 tertio butyl-3 methyl-5 phenyl] methane).

After having been de-gasified by successive melting and freezing, this flask is sealed and placed in a heat-controlled bath at 110°C. for 3 hours. At the end of the polymerization, the flask is broken and the polymer is ground by means of a turbo-grinder and washed with methanol. After drying under dynamic vacuum, there are obtained 46 grams of polymer (yield 90 percent).

Infra-red spectrography shows that it is a true case of a polymer obtained by opening the cycle. The polymer has a glass-transition temperature Tg of +65°C.

By means of an internal mixer of the Brabender type, 50 parts of di-iso-octyl-phthalate are incorporated for 100 parts of polymer at 110°C. The duration of mixing is 30 minutes.

The plastified mixture is transferred to a type AMIL two rollers mixer at a temperature of 70°C. There are then incorporated successively into the mixture at the time indicated, and for 150 parts of the plastified mixture : 3 minutes : 50 parts of SAF black (Vulcan 9 CABOT) ;

9 minutes : 5 parts of zinc oxide;
11 minutes : 2 parts of stearic acid;
12 minutes : 1 part of zinc salt of mercapto-benzimidazole;
13 minutes : 2 parts of sulphur ;
15 minutes : 1 part of N-cyclohexyl 2-benzothiozyl sulphene-amide; and mixing is carried on for 1 minute.

The master mixture is moulded and vulcanized at a temperature of 155°C. for 30 minutes; the closure pressure of the mould is 35.7 kgf/sq.mm. The test samples are then left to rest for 12 hours before beginning the tests.

The properties of the plastified and vulcanized mixture are as follows : glass-transition temperature : Tg = −26° C; breaking force : 1.2 kg/sq.mm.; elongation to breaking : 84 percent swelling in ASTM oil No.2: +0.8 percent; swelling in ASTM oil No.3 : 1.3 percent.

EXAMPLE 18

Polymer of the :

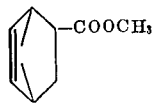

The operations are carried out as in Example 17, at a temperature of 90° C. for 3 hours, with 57.8 grams of methyl ester of bicyclo [2.2.1] heptene-2 oic-5,10 mg of $RuCl_3$, $3H_2O$, dissolved in 1 ml. of methyl alcohol, and 0.2 gram of 2246 antioxidizing agent. There are obtained 31 grams of polymer (yield 54 percent) having a glass-transition temperature Tg of 65° C. and a mean molecular weight (measured by light scattering on a SOFICA apparatus) of $2.4 \times 10^6$.

The properties of the plastified and vulcanized mixture are as follows: glass-transition temperature Tg = 32° C., breaking force: 2.2 kg/sq.mm ; modulus at 100 percent elongation : 0.64 kg/sq.mm.; modulus at 200 percent elongation: 0.99 kg/sq.mm; elongation to breaking of 224 percent; Shore A hardness: 67; resilience: 4 percent; compression remanence: 31.8 percent; swelling in ASTM rid No. 1: +0.3 percent; swelling in ASTM oil No. 2: 1.9 percent.

EXAMPLE 19

The operations are carried out following the technique of Example 17 at a temperature of 110° C. for 3 hours, with 47 grams of bicyclo [2.2.1] heptene-2 and 76 grams of acetate of bicyclo [2.2.1] heptene-2 ol-5, 59 mg of tri-hydrated ruthenium chloride, 400 mg of 2246 antioxidizing agent and 21 ml of butyl alcohol.

There are obtained 112 grams of co-polymer (yield 91 percent) containing 54.5 percent of units derived from bicyclo [2.2.1] heptene-2 according to elementary analysis and having a glass-transition temperature Tg = +38° C.

The properties of the plastified and vulcanized mixture following the procedure of Example 17, and replacing the di-iso-octyl-phthalate by Dutrex V2 oil (Shell) are as follows:

Glass-transition temperature Tg = −26° C; breaking force : 2.76 kg/sq.mm.; modulus at 100 percent elongation : 0.44 kg/sq.mm.; modulus at 200 percent elongation: 0.44 kg/sq.mm; modulus at 200 percent elongation : 0.74 kg/sq.mm.; elongation to breaking: 311 percent; Shore A hardness: 65; resilience: 4 percent; compression remanence: 27.15 percent; swelling in ASTM oil No. 1: 0 percent; swelling in ASTM oil No. 3: 0.8 percent.

EXAMPLE 20

The operation are carried out following the method of Example 17 at a temperature of 110° C. for 3 hours with 94 grams of bicyclo [2.2.1.] heptene-2 and 51 grams of acetate of bicyclo [2.2.1] heptene-2 ol-5, 60 mg of tri-hydrated ruthenium chloride, 400 mg of 2246 antioxidizing agent and 21 ml of butyl alcohol.

There are obtained 144 grams of co-polymer (yield 99.3 percent) containing 74.2 percent of units derived from bicyclo [2.2.1] heptene-2 according to elementary analysis, and having a glass-transition temperature Tg = +28° C.

The properties of the plastified and vulcanized mixture following the technique of Example 19 are as follows:

Glass-transition temperature Tg = 21° C, breaking force: 3.61 kg/sq.mm; modulus at 100 percent elongation: 0.24 kg/sq.mm;modulus at 200 percent elongation: 0.35 kg/sg.mm; elongation to breaking: 437 percent; Shore A hardness: 66; resilience 5.5 percent; compression remanence : 12.5 percent.

EXAMPLE 21

The same procedure is followed as in Example 17 at a temperature of 110° C. for 3 hours with 54 grams of methyl-5 bicyclo [2.2.1] heptene-2 and 76 grams of acetate of bicyclo [2.2.1] heptene-2 ol-5, 59 mg of tri-hydrated ruthenium chloride, 400 mg of 2246 anti-oxidizing agent and 21 ml of butyl alcohol.

There are obtained 116 grams of co-polymer (yield 89 percent) containing 52 percent of units derived from methyl-5-bicyclo [2.2.1] heptene-2 according to elementary analysis, and having a glass-transition temperature Tg = 39° C.

The properties of the plastified and vulcanized mixture following the technique of Example 19, are as follows:

Glass-transition temperature Tg = −29° C., breaking force: 2.55 kg/sq.mm; modulus at 100 percent elongation: 0.33 kg/sq.mm.; modulus at 200 percent elongation: 0.67 kg/sq.mm.; elongation to breaking: 335 percent; Shore A hardness:59;resilience: 5 percent; compression remanence: 35 percent; swelling in ASTM oil No. 1; 0.1 percent; in ASTM oil No. 2: 0.4 percent; in ASTM oil No. 3: 1 percent.

EXAMPLE 22

The same procedure is followed as in Example 17 at a temperature of 60° C. for 5 hours with 84.6 grams of bicyclo [2.2.1] heptene-2 and 15.2 grams of methyl ester of bicyclo [2.2.1] heptene-2 oic-5, 3 mg of tri-hydrated ruthenium chloride, 500 mg of 2246 anti-oxidizing agent and 2 ml of methyl alcohol.

There are obtained 63.8 grams of co-polymer (yield 64 percent) containing 93 percent of units derived from bicyclo [2.2.1] heptene-2 according to elementary analysis and having a glass-transition temperature Tg = 31°C.

The properties of the plastified and vulcanized mixture following the technique of Example 19 are as follows:

Glass-transition Tg = 23° C.; breaking force : 3.06 kg/sq.mm;modulus at 100 percent elongation: 0.23 kg/sq.mm.; modulus at 200 percent elongation: 0.34 kg/sq.mm.; elongation to breaking: 411 percent; swelling in ASTM oil No. 1: −0.2 percent swelling in ASTM oil No. 2: 0.2 percent; in ASTM oil No. 3: 5 percent.

EXAMPLE 23

The operations are carried out according to the technique of Example 17 at a temperature of 60° C for 3 hours with 47 grams of bicyclo [2.2.1] heptene-2 and 76 grams of methyl ester of bicyclo [2.2.1] heptene-2 oic-5, 3 mg of tri-hydrated ruthenium chloride, 500 mg of 2246 anti-oxidizing agent and 2 ml of methyl alcohol.

There are obtained 36.6 grams of co-polymer (yield 30 percent) containing 68 percent of units derived from bicyclo [2.2.1] heptene-2 according to elementary analysis, and having a glass-transition temperature Tg = 35°C.

The properties of the plastified and vulcanized mixture following the procedure of Example 19 are as follows:

Glass-transition temperature Tg = 16° C.; breaking force: 2.75 kg/sq.mm; modulus at 100 percent elongation: 0.34 kg/sq.mm; modulus at 200 percent elongation: 0.57 kg/sq.mm; elongation to breaking: 341 percent; swelling in ASTM oil No. 1: 0 percent; in ASTM oil No. 2: 0.2 percent; in ASTM oil No. 3: 1.6 percent.

EXAMPLE 24

The operations are carried out following the technique of Example 17 at a temperature of 60° C for 3 hours with 54 grams of methyl-5-bicyclo [2.2.1] heptene-2 and 76 grams of methyl ester of bicyclo [2.2.1] heptene-2 oic-5, 3 mg of tri-hydrated ruthenium chloride, 500 mg of 2246 anti-oxidizing agent and 2 ml of methyl alcohol.

There are obtained 35.1 grams of co-polymer (yield 27 percent) containing 53 percent of units derived from methyl-5 bicyclo [2.2.1] heptene-2 according to elementary analysis and having a glass-transition temperature Tg = 37°C.

The properties of the plastified and vulcanized mixture following the technique of Example 19, are as follows:

Glass-transition temperature Tg = 14° C.; breaking force: 2.60 kg/sq.mm.; modulus at 100 percent elongation: 0.29 kg/sq.mm; modulus at 200 percent elongation : 0.45 kg/sq.mm; elongation to breaking: 376 percent; swelling in ASTM oil No. 1: 0.1 percent; in ASTM oil No. 2: 0.2 percent; in ASTM oil No. 3: 3.3 percent.

EXAMPLE 25

The operations are carried out following the technique of Example 17 at a temperature of 80° C. for 20 hours with 30 grams of methyl-5 bicyclo [2.2.1] heptene-2 and 30 grams of methyl diester of exo-cisbicyclo [2.2.1] heptene-2 dioic-5,6, 300 mg of tri-hydrated ruthenium chloride, 330 mg of 2246 anti-oxidizing agent, 12 ml of methyl alcohol and 60 ml of toluene. The above diester is obtained by esterification of the product of condensation of maleic anhydride on cyclo-pentadiene, this condensation product being isomerized in the form exo by heat treatment.

There are obtained 44 grams of co-polymer (yield 73 percent) containing 26 percent of units derived from the diester according to elementary analysis and having a glass-transition temperature Tg = 30° C.

The properties of the mixture plastified and vulcanized following the technique of Example 19 are as follows:

Glass-transition temperature Tg = −25° C.; breaking force: 1.89 kg/sq.mm; modulus at 100 percent elongation; 1.47 kg/sq.mm; elongation to breaking: 154 percent; swelling in ASTM oil No. 1: −0.5 percent; in ASTM No. 2: 0.1 percent; in ASTm oil No. 3; 1.6 percent.

EXAMPLE 26

The operations are carried out following the method of Example 17 at a temperature of 80° C. for 20 hours with 33 grams of bicyclo [2.2.1] heptene-2 and 33 grams of methyl diester of exo-cis bicyclo [2.2.1] heptene-2,dioic-5,6 300 mg of tri-hydrated ruthenium chloride, 330 mg of 2246 anti-oxidizing agent, 12 ml of methyl alcohol and 60 ml of toluene.

There are obtained 50.5 grams of co-polymer (yield 76.5 percent) containing 22 percent of units derived from the diester according to elementary analysis, and having glass-transition temperature Tg = 30° C.

The properties of the mixture plastified and vulcanized following the method of Example 19 are as follows:

Glass-transition temperature Tg = 23° C.; breaking force 2.30 kg/sq.mm; modulus at 100 percent elongation: 1.14 kg/sq.mm; modulus at 200 percent elongation: 1.01 kg/sq.mm.; elongation to breaking : 234 percent; swelling in ASTM oil No. 1: −0.2 percent; in ASTM oil No. 2: 0.15 percent; in ASTM oil No. 3: 1.4 percent.

EXAMPLE 27

The operations are carried out following the method of Example 17 at a temperature of 90° C. for 3 hours with 16.6 grams of methyl diester of the trans bicyclo [2.2.1] heptene-2 dioic-5,6 and 18.8 grams of bicyclo [2.2.1] heptene-2, 4 mg of tri-hydrated ruthenium chloride, 100 mg of 2246 anti-oxidizing agent and 1 ml of methyl alcohol.

There are obtained 14.6 grams of co-polymer (yield 41 percent) containing 89 percent of units derived from bicyclo [2.2.1] heptene-2 according to elementary analysis and having a glass-transition temperature Tg = 40° C.

The properties of the mixture plastified and vulcanized following the technique of Example 19 are as follows:

Glass-transition temperature : Tg = −21° C.; breaking force: 3.65 kg/sq.mm; modulus at 100 percent elongation: 1.03 kg/sq.mm; modulus at 200 percent elongation: 1.37 kg/sq.mm; elongation to breaking : 255 percent; Shore A hardness: 79; resilience: 7.5 percent, compression remanence: 30.8 percent; swelling in ASTM oil No. 1: 0 percent ; in ASTM oil No. 2: 0 percent; in ASTM oil No. 3: +1.9 percent.

EXAMPLE 28

The operation is carried out following the method of Example 17 at a temperature of 90° C for 3 hours, with 31.6 grams of methyl diester of trans bicyclo [2.2.1] heptene-2 dioic-5,6 and 9.4 grams of bicyclo [2.2.1] heptene-2, 2 mg of tri-hydrated ruthenium chloride, 100 mg of anti-oxidizing agent 2246 and 1 ml of methyl alcohol.

There are obtained 14.4 grams of co-polymer (yield 35 percent) containing 67.5 percent of units derived from bicyclo [2.2.1] heptene-2 according to elementary analysis, and having a glass-transition temperature Tg = 40°C.

The properties of the mixture plastified and vulcanized following the method of Example 19 are as follows:

Glass-transition temperature : Tg = −24° C; breaking force: 2.83 kg/sq.mm; modulus at 100 percent elongation: 0.85 kg/sq.mm; elongation to breaking : 170 percent; Shore A hardness: 94.5; resilience: 21 percent; compression remanence 20.6 percent; swelling in ASTM oil No. 1: +0.1 percent; in ASTM oil No. 2: +0.1 percent; in ASTM oil No. 3: +0.4%.

EXAMPLE 29

The operations follows the technique of Example 17 at a temperature of 90° C. for 3 hours with 10.8 grams of methyl diester of trans bicyclo [2.2.1] heptene-2 dioic-5,6 and 10.8 grams of methyl-5 bicyclo [2.2.1] heptene-2, 4 mg of tri-hydrated ruthenium chloride, 100 mg of anti-oxidizing agent 2246 and 1 ml of methyl alcohol.

There are obtained 11.6 grams of co-polymer (yield 54 percent) containing 52 percent of units derived from methyl-5 bicyclo [2.2.1] heptene-2 according to elementary analysis, and having a glass-transition temperature $Tg = 42°C$.

The properties of the mixture plastified and vulcanized in accordance with the method given in Example 19 are as follows:

Glass-transition temperature $Tg = -20°C$.; breaking force: 2.65 kg/sq.mm; modulus at 100 percent elongation: 1.14 kg/sq.mm; modulus at 200 percent elongation: 1.42 kg/sq.mm; elongation to breaking: 252 percent; Shore A hardness: 82; resilience: 10 percent; compression remanence : 26.8 percent; swelling in ASTM oil No. 1: −0.1 percent; in ASTM oil No. 2: +0.3 percent; in ASTM oil No. 3: 1.7 percent.

Example 30

Into a flask there are introduced 57.8 grams of methyl ester of bicyclo [2.2.1] heptene-2 oic-5, 1 ml of methyl alcohol, 10 mg of tri-hydrated ruthenium chloride, 0.2 gram of anti-oxidizing agent 2246 and 15 grams of di-isooctylphthalate.

After having been de-gasified by successive melting and freezing, this flask is sealed and placed in a heat-controlled bath at 90° C for 3 hours. At the end of the polymerization, the flask is broken and the polymer is dried under dynamic vacuum. There are obtained 45 grams of polymer (yield 52 percent with respect ot the monomer) and the glass-transition temperature $Tg = -32°C$. The polymer contains 15 grams of phthalate.

The mechanical properties of this polymer filled and vulcanized following the method given in Example 17, are identically the same as those of the polymer of Example 18.

The elastomers according to the invention have advantageous characteristics and are particularly suitable for the fields of application of elastomers and in particular as shock-absorbers, rail-way buffers, bumper buffers for automobile vehicles, vehicle suspensions, elements of aircraft under-carriages, protection of platforms and hulls of ships, etc.

It will furthermore be understood that the present invention has been described solely by way of explanation and not in any limitative sense and that any useful modification may be made thereto without thereby departing from its scope.

We claim:

1. A vulcanized elastomer composition consisting essentially of a vulcanized mixture of:

a. 100 parts by weight of a macromulecular polymer compound selected from the group consisting of substantially amorphous homopolymers of bicyclo [2.2.1] heptene-2 and its substituted derivatives of the formula

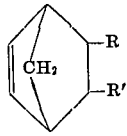

wherein R is H, $CH_3$, $CO_2CH_3$ or $OCOCH_3$, and R′ is H or $CO_2CH_3$ with the condition that when R′ is $CO_2CH_3$ then R is also $CO_2CH_3$; and the substantially amorphous copolymers of bicyclo [2.2.1] heptene-2 with one of its substituted derivatives of the above formula and the substantially amorphous copolymers of two of said substituted derivatives between each other; said polymer compound having an initial glass transition temperature of about 25°–65° C., and resulting from the opening of the cycle containing the double bond, said polymer compound containing simultaneously double bonds in the cis-position and double bonds in the trans-position, obtained by polymerization in the presence as initiator of a salt of a noble metal of the platinum group and an alcohol reducing agent; and b. 30–400 parts by weight of at least one compound having a low volatility and a freezing point less than −30° C., selected from the group consisting of the organic esters derived from aliphatic and cyclanic alcohols, the aliphatic, aromatic and naphthenic hydrocarbons, and their mixtures;

the mixture of said polymer compound and said low volatility compound prior to vulcanization having a glass transition temperature lower than about −10° C.;

said vulcanized composition having very low rebound resilience, high breaking strength associated with good compression remanence, good resistance to oil and ageing, and good tensile properties.

2. A vulcanized elastomer composition in accordance with claim 1 wherein said compound having a low volatility and a freezing point less than −30° C. is selected from the group consisting of aromatic and naphthenic hydrocarbons and mixtures of essentially aromatic type hydrocarbons and mixtures of essentially naphthenic type hydrocarbons.

3. A vulcanized elastomer composition in accordance with claim 1, further comprising up to 400 parts by weight of a filler selected from the group consisting of carbon black, silica, kaolin, and $CaCO_3$.

4. A method of manufacture of a composition as claimed in claim 1, comprising the polymerization of the said bicyclo [2.2.1] heptene-2 compound according to said formula in the presence of said compound having a low volatility and a freezing point lower than −30° C. and containing substantially no ethylene unsaturation and followed by the vulcanization.

5. A vulcanized composition of elastomer material in accordance with claim 1 having a breaking strength of 4 kg/sq.mm and a rebound resilience of 3 percent wherein said polymer compound consists of amorphous homo-polymer of bicyclo [2.2.1] heptene-2, and further comprising 40 parts by weight of an essentially aromatic oil and 60 parts by weight of carbon black.

6. A vulcanized elastomer composition in accordance with claim 1, wherein said polymer compound is an amorphous homo-polymer of bicyclo [2.2.1] heptene-2; and further comprising up to 400 parts by weight of carbon black, silica, kaolin or $CaCO_3$.

7. A vulcanized elastomer composition in accordance with claim 1, wherein said polymer compound is an amorphous homo-polymer of methyl-5-bicyclo [2.2.1] heptene-2; and further comprising up to 200 parts by weight of carbon black, silica, kaolin or $CaCO_3$.

8. A vulcanized elastomer composition in accordance with claim 1, wherein said polymer compound is an amorphous homo-polymer of bicyclo [2.2.1]heptene-2 oic-5; and further comprising up to 200 parts by weight of carbon black, silica, kaolin or $CaCO_3$.

9. A vulcanized elastomer composition in accordance with claim 1, wherein said polymer compound is an amorphous homo-polymer of bicyclo [2.2.1]heptene-2 ol-5; and further comprising up to 200 parts by weight of carbon black, silica, kaolin or $CaCO_3$.

10. A vulcanized elastomer composition in accordance with claim 1 wherein said polymer compound is an amorphous copolymer of bicyclo [2.2.1]heptene-2 and methyl-5-bicyclo [2.2.1] heptene-2; and further comprising up to 200 parts by weight of carbon black, silica, kaolin or $CaCO_3$.

11. A vulcanized elastomer composition in accordance with claim 1 wherein said polymer compound is an amorphous copolymer of bicyclo [2.2.1]heptene-2 and acetate of bicyclo [2.2.1]heptene-2 ol 5;

and further comprising up to Kaolin 200 parts by weight of carbon black, silica, daolin or $CaCO_3$.

12. A vulcanized elastomer composition in accordance with claim 1 wherein said polymer compound is an amorphous copolymer of bicyclo [2.2.1]heptene-2 and methyl ester of bicyclo [2.2.1]heptene-2 oic 5; and further comprising up to 200 parts by weight of carbon black, silica, kaolin or $CaCO_3$.

13. A vulcanized elastomer composition in accordance with claim 1 wherein said polymer compound is an amorphous copolymer of bicyclo [2.2.1] heptene-2 and dimethyl trans ester of bicyclo [2.2.1]heptene-2 dioic-5,6; and further comprising up to 200 parts by weight of carbon black, silica, kaolin or $CaCO_3$.

14. A vulcanized elastomer composition in accordance with claim 1 wherein said polymer compound is an amorphous copolymer of bicyclo [2.2.1]heptene-2 and the exo-cis dimethyl ester of bicyclo [2.2.1]heptene-2 dioic-5,6; and further comprising up to 200 parts by weight of carbon black, silica, kaolin or $CaCO_3$.

15. A vulcanized elastomer composition in accordance with claim 1 wherein said polymer compound is an amorphous copolymer of methyl-5 bicyclo [2.2.1]heptene-2 and the acetate of bicyclo [2.2.1]heptene-2 ol 5; and further comprising up to 200 parts by weight of carbon black, silica, kaolin or $CaCO_3$.

16. A vulcanized elastomer composition in accordance with claim 1 wherein said polymer compound is an amorphous copolymer of methyl-5 bicyclo [2.2.1]heptene-2 and the methylester of bicyclo [2.2.1]heptene-2 oic-5; and further comprising up to 200 parts by weight of carbon black, silica, kaolin or $CaCO_3$.

17. A vulcanized elastomer composition in accordance with claim 1 wherein said polymer compound is an amorphous copolymer of methyl-5 bicyclo [2.2.1]heptene-2 and the trans dimethyl ester of bicyclo [2.2.1]heptene-2 dioic-5,6; and further comprising up to 200 parts by weight of carbon black, silica, kaolin or $CaCO_3$.

18. A vulcanized elastomer composition in accordance with claim 1 wherein said polymer compound is an amorphous copolymer of methyl-5 bicyclo [2.2.1]heptene-2 and the exo-cis dimethyl ester of bicyclo [2.2.1]heptene-2 dioic-5,6; and further comprising up to 200 parts by weight of carbon black, silica, Kaolin or $CaCO_3$.

19. A vulcanized elastomer composition in accordance with claim 1 wherein said polymer is an amorphous poly bicyclo [2.2.1]heptene-2; and further comprising 200 parts of a mixture of mainly aromatic or naphthenic hydrocarbon oils and 200 parts of S.A.F. type carbon black and having a rebound resilience below 30 percent between −50° C. and +60° C.

20. A vulcanized elastomer composition in accordance with claim 1 wherein said polymer is an amorphous poly bicyclo [2.2.1]heptene-2; and further comprising 400 parts of a mixture of a mainly aromatic hydrocarbon oil and 400 parts of S.A.F. type carbon black and having a rebound resilience below 25 percent between −50° C. and +60° C.

* * * * *